United States Patent
Lin et al.

(10) Patent No.: US 10,817,253 B2
(45) Date of Patent: Oct. 27, 2020

(54) ULTRASONIC COMMUNICATION SYSTEM WITH INDEPENDENT VOLUME CONTROL FOR AN AUDIBLE FREQUENCY RANGE

(71) Applicant: INTEL CORPORATION, Santa Clara, CA (US)

(72) Inventors: Xintian Lin, Palo Alto, CA (US); Matias Almada, Columbus, GA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/398,928

(22) Filed: Apr. 30, 2019

(65) Prior Publication Data

US 2019/0258453 A1      Aug. 22, 2019

(51) Int. Cl.
    *G06F 3/16*         (2006.01)
(52) U.S. Cl.
    CPC .................................. *G06F 3/165* (2013.01)

(58) Field of Classification Search
    CPC ........................... G06F 3/165; G01S 1/72–82
    See application file for complete search history.

(56) References Cited

U.S. PATENT DOCUMENTS

2013/0163770 A1* 6/2013 Takemura ............... H04R 3/14
                                                    381/59
2018/0252796 A1* 9/2018 Qu ............................ G01S 5/30

* cited by examiner

*Primary Examiner* — Mark Fischer
(74) *Attorney, Agent, or Firm* — Green, Howard & Mughal LLP.

(57) ABSTRACT

An embodiment of an audio controller device includes technology to control an output of a first audio signal from an audio output device in a human interface frequency range, where the human interface frequency range includes frequencies audible to humans, and control an output of a second audio signal from the audio output device in a device interface frequency range independent from the output of the first audio signal, where the device interface frequency range includes frequencies above an upper limit of the human interface frequency range. Other embodiments are disclosed and claimed.

15 Claims, 9 Drawing Sheets understand# ULTRASONIC COMMUNICATION SYSTEM WITH INDEPENDENT VOLUME CONTROL FOR AN AUDIBLE FREQUENCY RANGE

BACKGROUND

Sound may be encoded with data and sent by a transmitter, such as a speaker, to a receiver, such as a microphone. The nominal frequency range which is considered to be audible by humans is from 20 Hz to 20 kHz. Ultrasound technology may involve sound waves with frequencies above the upper limit of the nominal audible range (e.g., >20 kHz). An ultrasonic beacon may refer to an inaudible sound encoded with data that can be received and decoded by a listening device.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
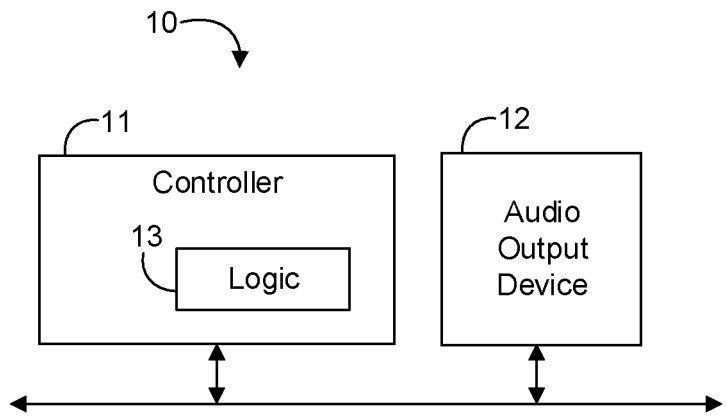
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, systems, and articles are described herein related to ultrasonic communication systems. More particularly, some embodiments relate to an ultrasonic communication system with independent volume control for an audible frequency range.

With reference to FIG. 1, an embodiment of an electronic system 10 may include an audio output device 12 to output a first audio signal in a human interface frequency range and to output a second audio signal in a device interface frequency range, wherein the human interface frequency range includes frequencies audible to humans and wherein the device interface frequency range includes frequencies above an upper limit of the human interface frequency range, and a controller 11 communicatively coupled to the audio output device 12. The controller 11 may include logic 13 to control an output of the first audio signal from the audio output device 12 in the human interface frequency range, and control an output of the second audio signal from the audio output device 12 in the device interface frequency range independent from the output of the first audio signal. The logic 13 may likewise be configured to control an output of the first audio signal independent from the output of the second audio signal. In some embodiments, the logic 13 may be configured to control a volume of the second audio signal from the audio output device 12 in the device interface frequency range independent from the volume of the first audio signal. For example, the logic 13, may be configured to mute the first audio signal over the human interface frequency range without significant reduction of volume for the second audio signal in the device interface frequency range.

In some embodiments, the logic 13 may additionally, or alternatively, be configured to pass audio frequencies in the device interface frequency range without substantial attenuation, and adjustably attenuate audio frequencies below the device interface frequency range. For example, the logic 13 may be configured to dynamically adjust the attenuation of audio frequencies below the device interface frequency range based on a user input. In some embodiments, the logic 13 may also be configured to adjust the device interface frequency range based on one or more of a user configurable input parameter and a device configurable parameter which corresponds to the audio output device 12. In any of the embodiments herein, the second audio signal may be encoded with non-audio related information to be communicated to an external device.

Embodiments of each of the above controller 11, audio output device 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 11 may include a general purpose processor, a special purpose processor, a central processor unit (CPU), a graphic processor, a general purpose controller, a special purpose controller, an audio controller, a micro-controller, etc.

In some embodiments, the logic 13, may be located in, or co-located with, various components, including the controller 11 (e.g., on a same die). For example, the logic 13 may be implemented on a semiconductor apparatus which may include one or more substrates, with the logic 13 coupled to the one or more substrates. In some embodiments, the logic 13 may be at least partly implemented in one or more of configurable logic and fixed-functionality hardware logic on semiconductor substrate(s) (e.g., silicon, sapphire, gallium-arsenide, etc.). For example, the logic 13 may include a transistor array and/or other integrated circuit components coupled to the substrate(s) with transistor channel regions that are positioned within the substrate(s). The interface between the logic 13 and the substrate(s) may not be an abrupt junction. The logic 13 may also be considered to include an epitaxial layer that is grown on an initial wafer of the substrate(s).

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, firmware memory, persistent storage media, or other system memory may store a set of instructions which when executed by the controller 11 cause the system 10 to implement one or more components, features, or aspects of the system 10 (e.g., the logic 13, controlling the output of the first audio signal in the human interface frequency range, controlling the output of the second audio signal in the device interface frequency range independent from the output of the first audio signal, etc.).

Sound or audio may refer to acoustic waves which are a type of longitudinal waves that propagate by compression and decompression in an adiabatic process. The frequency range of acoustic waves is between 1 Hz to tens of thousands of Hz. Nominally, a human can hear between 20 Hz to 20 kHz, although the upper limit of this range generally diminishes with age (e.g., with frequencies above about 16 kHz becoming inaudible to most humans). An example human interface frequency range may include substantially the entire audible frequency range of 20 Hz and above, up to just less than 20 kHz (e.g., 19.9 kHz). An example device interface frequency range may include only ultrasonic frequencies of 20 kHz or greater (e.g., up to 40 kHz). For some practical environments (e.g., an office conference room), the upper limit of the audible range may be effectively set at about 16 kHz (e.g., or 17 kHz, 18 kHz, etc.). In this example, the human interface frequency range may include an audible frequency range of 20 Hz and above, up to just less than 16 kHz (e.g., 15.9 kHz), while the device interface frequency range may include inaudible, near-ultrasonic frequencies of 16 kHz or greater (e.g., and may further include ultrasonic frequencies up to 40 kHz).

The audio output device may include any suitable transducer technology. A transducer is a device that converts one form of energy to another. An audio or sound transducer may include an input sensor (e.g., a sound to electrical transducer such as a microphone) or an output actuator (e.g., an electrical to sound transducer such as a loudspeaker). Sound transducers can detect and transmit sound waves. Infrasound refers to sound waves with very low frequencies, while ultrasound refers to sound waves with very high frequencies. In an ultrasonic communication system, a first device includes encodes non-audio related information to send via a loudspeaker transmitter which is capable of producing ultrasonic sound waves (e.g., or inaudible, near-ultrasonic sound waves), and a second device includes a microphone receiver to sense the sound waves and decode non-audio related information.

A suitably configured loudspeaker may operate as an output sound transducer for both the human interface frequency range (e.g., an audible range) and the device interface frequency range (e.g., an inaudible and/or ultrasonic range). Suitable loudspeakers are commercially available in a variety of sizes, shapes and frequency ranges. The transducer of a loudspeaker may include a pressure unit to transform electrical signals into air pressure. For example, a loudspeaker may consist of a motor unit which transforms input electrical waves into vibrations and a diaphragm that moves sufficient air in order to make the vibrations audible. Embodiments may be configured with a variety of types of loudspeakers including, for example, moving iron, moving coil, piezoelectric, isodynamic, and electrostatic.

Alternatively, some embodiments may include a separate ultrasonic transducer to output an ultrasonic vibration encoded with the non-audio related information. A mechanical ultrasonic transducer may include gas-driven, or pneumatic, transducers such as whistles as well as liquid-driven transducers such as hydrodynamic oscillators and vibrating blades. An electromechanical ultrasonic transducers may include piezoelectric and magnetostrictive devices. Piezoelectric and magnetostrictive transducers may also be employed as ultrasonic receivers, picking up an ultrasonic vibration and converting it into an electrical oscillation.

As noted above, both the frequency hearing range of humans and the input/output frequency range of audio transducers may vary. Advantageously, some embodiments may include technology to adjust the human interface frequency range and/or the device interface frequency range. Any suitable user interface technology may be utilized to enter suitable lower and upper limits for the ranges. For example, a developer may enter the device interface frequency range limits in firmware based on data provided by the device manufacturer. Additionally, or alternatively, a suitable user interface may allow the user to directly enter the human interface frequency range and/or the device interface frequency range at the BIOS level, OS level, or application level. The upper limit of the human interface frequency range and corresponding lower limit of the device interface frequency range may be set based on an entry of the youngest user's age and a lookup table that stores the typical hearing range at various ages.

Additionally, or alternatively, the upper limit of the human interface frequency range and corresponding lower limit of the device interface frequency range may be set based on a tone generator test. For example, the audio system may generate an output at a series of frequencies and prompt the user to indicate which tones they can hear. The upper limit of the human interface frequency range may be set to the highest frequency tone which is still audible to the user (e.g., with the lower limit of the device interface frequency range set just above the user's audible range). The foregoing should only be considered as non-limiting examples of how to adjust the lower and upper limits of the human and/or device interface frequency ranges. Given the benefit of the present specification and drawings, numerous other suitable user interfaces and techniques for adjusting those limits will occur to those skilled in the art.

Figure 2A:
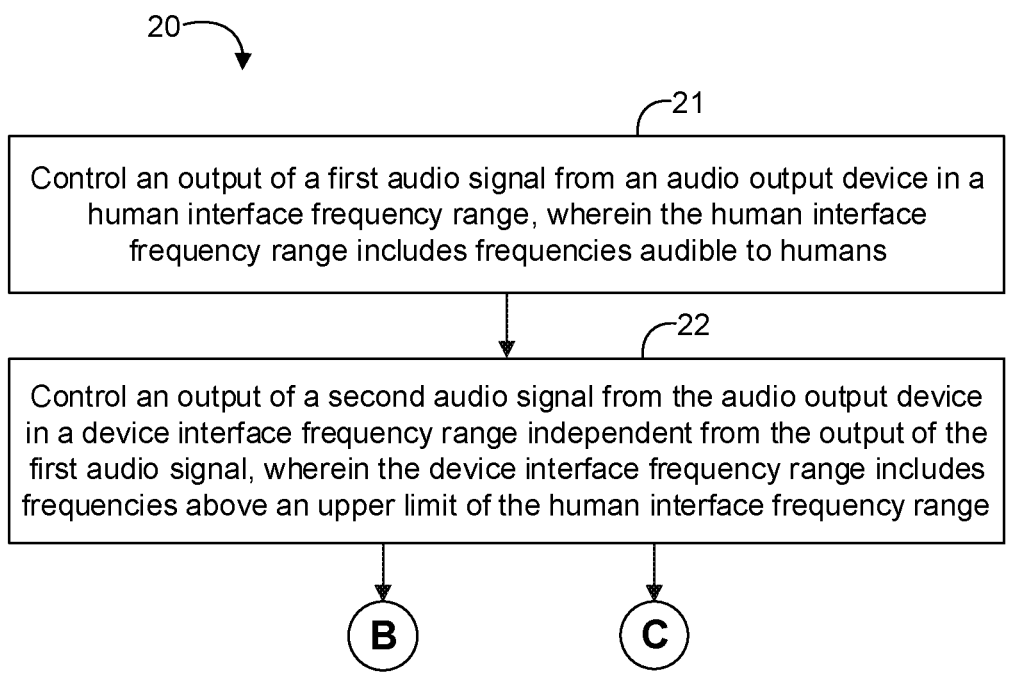
FIGS. 2A to 2C are flowcharts of an example of a method of controlling audio according to an embodiment.
Figure 2B:
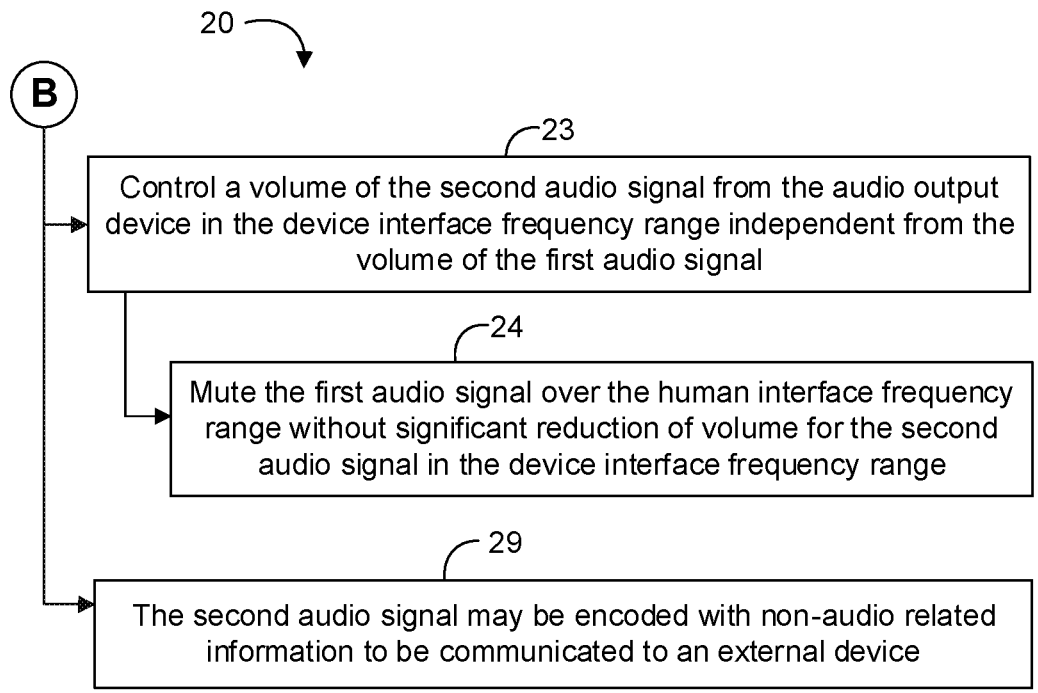
Figure 2C:
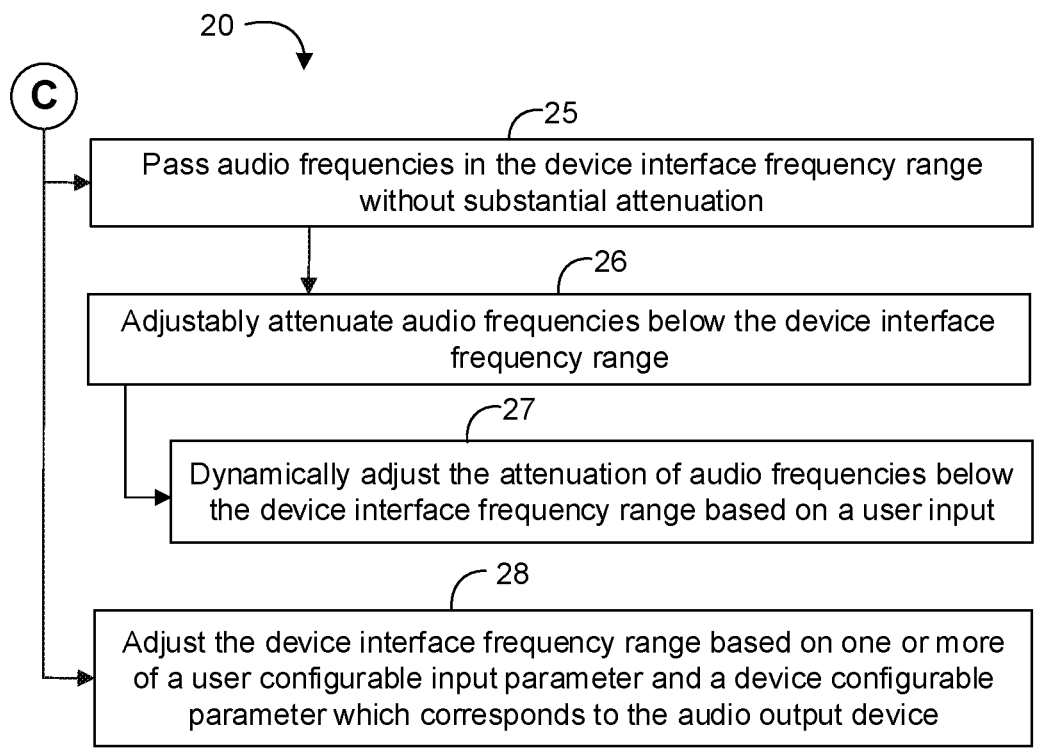

Turning now to FIGS. 2A to 2C, an embodiment of a method 20 of controlling audio may include controlling an output of a first audio signal from an audio output device in a human interface frequency range at block 21, wherein the human interface frequency range includes frequencies audible to humans, and controlling an output of a second audio signal from the audio output device in a device interface frequency range independent from the output of the first audio signal at block 22, wherein the device interface frequency range includes frequencies above an upper limit of the human interface frequency range (e.g., and/or controlling an output of the first audio signal independent from the output of the second audio signal). Some embodiments of the method 20 may further include controlling a volume of the second audio signal from the audio output device in the device interface frequency range independent from the volume of the first audio signal at block 23. For example, the method 20 may include muting the first audio signal over the human interface frequency range without significant reduction of volume for the second audio signal in the device interface frequency range at block 24.

Some embodiments of the method 20 may further include passing audio frequencies in the device interface frequency range without substantial attenuation at block 25, and adjustably attenuating audio frequencies below the device interface frequency range at block 26. For example, the method 20 may include dynamically adjusting the attenuation of audio frequencies below the device interface frequency range based on a user input at block 27. The method 20 may also include adjusting the device interface frequency range based on one or more of a user configurable input parameter and a device configurable parameter which corresponds to the audio output device at block 28. In any of the embodiments herein, the second audio signal may be encoded with non-audio related information to be communicated to an external device at block 29.

Embodiments of the method 20 may be implemented in a system, apparatus, computer, device, etc., for example, such as those described herein. More particularly, hardware implementations of the method 20 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 20 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 20 may be implemented on a computer readable medium as described in connection with Examples 15 to 21 below. Embodiments or portions of the method 20 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide technology for an audible specific mute functionality for ultrasonic beacon enabled playback devices. Advances in audio/video conferencing technologies are enabling more efficient collaboration across the industry. For example, INTEL CORPORATION NEXT UNIT COMPUTING (NUC) mini-PCs may be used with INTEL UNITE software to enable wireless display capabilities in conference rooms across an organization. An INTEL UNITE plugin for ultrasonic join may use the wireless display's speakers to broadcast an inaudible ultrasonic signal that allows other nearby computers to seamlessly connect/authenticate/provision to the INTEL UNITE hub (e.g., including the wireless display).

The technology enables fast and secure wireless display connectivity with just one click. However, if the wireless display also allows for wireless audio playback from the connected device, some situations may allow the connected client to inadvertently mute or disable the ultrasonic broadcasting. This mute toggle does not only affect new users from auto-connecting to the display but may also impact a secure auto-disconnect (e.g., where the client device exits the conference room and the device no longer 'hears' the ultrasonic signal and disconnects from the wireless display session). Volume settings and/or mute settings appear in many different locations, from the user's perspective. For example, such settings may appear on a personal computer (PC) connected to a display (e.g., or television), even during a wireless connection. The user may find they can alter the volume at the OS level, in the application playing the stream, and also the wireless display application may have an OS volume control, and lastly, the display itself may have a physical volume control. There are many stages the ultrasonic signals may be inadvertently suppressed.

Advantageously, some embodiments provide technology for a playback device functionality which includes an "audible mute" feature (e.g., which may be provided at one or more locations in the audio system, and preferably throughout the entire audio system). For example, an audible mute toggle mode may function similar to a conventional mute toggle mode from the user's perspective, except that the audible mute mode will only affect the audible spectrum while continuing to pass the inaudible spectrum utilized for sideband device communication. Embodiments of a playback device with the audible mute mode may advantageously allow for a broader range of ultrasonic proximity use cases and may give the user the freedom to control the audible spectrum's volume/muting while decoupling the adjustment of the ultrasonic proximity signals which serve to provide contextual telemetry from host to client devices.

An audible mute feature or audible volume adjustment' may be implemented with any suitable technology. Some embodiments include technology to control the volume, including muting, of the audible spectrum (e.g., 20-20 kHz) while leaving the ultrasonic spectrum (e.g., >20 kHz) substantially unaltered. In one example, an adjustable high-pass filter is applied to the output stream of the playback device to adjust only the audible spectrum's sound power level. Advantageously, some embodiments give a user the ability to alter the volume of audible sources (e.g., speech, music, system sounds, etc.) while leaving an ultrasonic beacon's volume unaltered. For a wide variety of ultrasonic use cases (e.g., any device/application which requires or benefits from ultrasound proximity radio functionality), some embodiments may help ensure uninterrupted operation and a better user experience.

Figure 3:
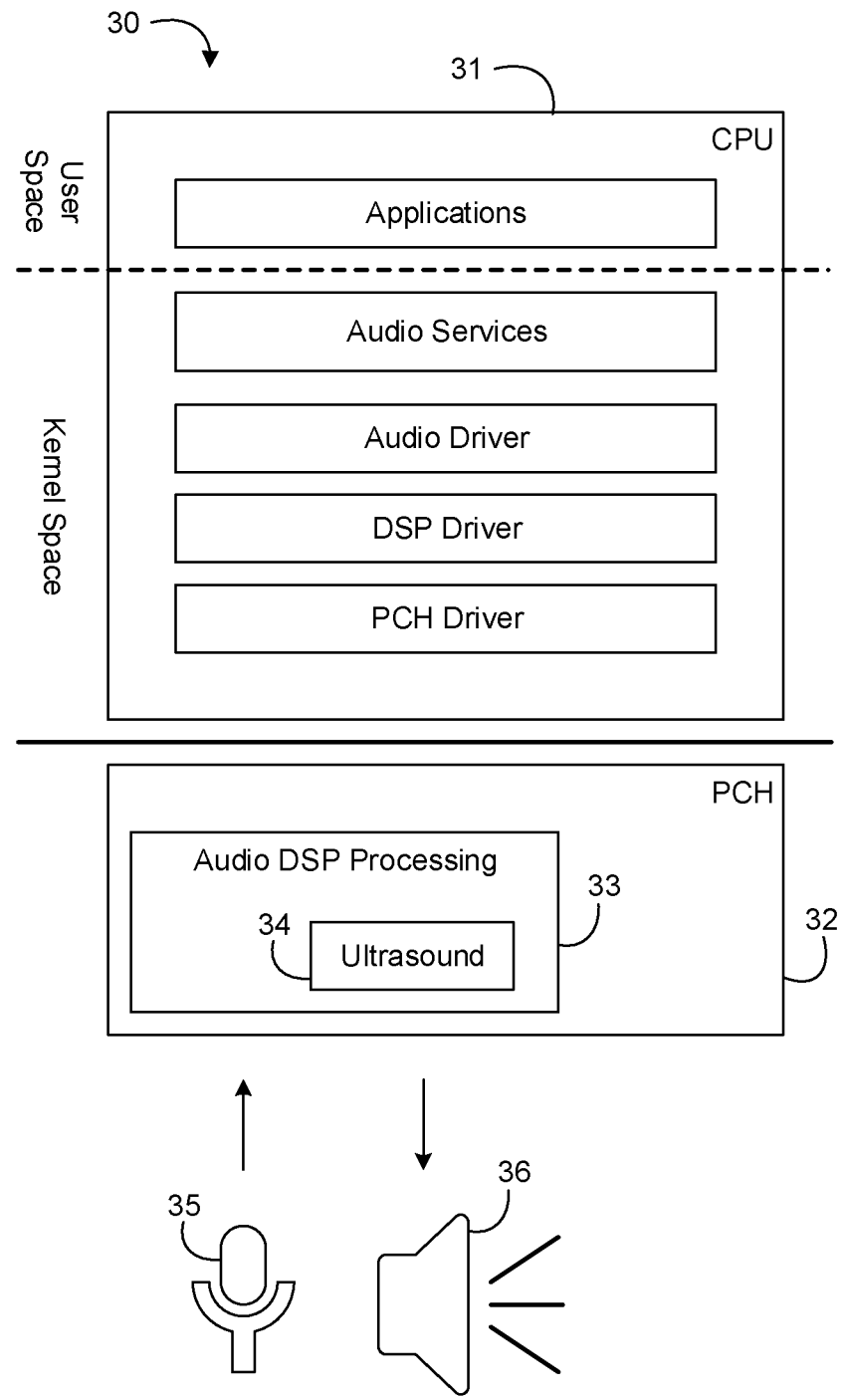
FIG. 3 is a block diagram of another example of an electronic system according to an embodiment.

Turning now to FIG. 3, an embodiment of an electronic system 30 may include a CPU 31 communicatively coupled to a platform controller hub (PCH) 32. The CPU 31 may support a user space (e.g., for applications) and a kernel space (e.g., for services, drivers, etc.). The kernel space may include audio services which communicate through an audio driver, a digital signal processor (DSP) driver, and a PCH driver to the PCH 32. The PCH 32 may include audio DSP (ADSP) 33 processing which may support ultrasound 34 communications (e.g., an ultrasonic beacon). The PCH 32 may be coupled to one or more microphones 35 and loudspeakers 36 configured to receive and transmit sound waves in both a human audible frequency range and a human inaudible frequency range (e.g., including ultrasonic frequencies) for communication with compatible external devices (e.g., sideband communication).

Advantageously, the system 30 may include technology to implement one or more features or aspects of the system 10 (FIG. 1), the method 20 (FIGS. 2A to 2C), and/or any of the other embodiments described herein. For example, the loudspeaker 36 may be configured to output a first audio signal in a human interface frequency range and to output a second audio signal in a device interface frequency range, where the human interface frequency range includes frequencies audible to humans and where the device interface frequency range includes frequencies above an upper limit of the human interface frequency range. The ADSP 33 may be configured to control an output of the first audio signal from the loudspeaker 36 in the human interface frequency range, and control an output of the second audio signal from the loudspeaker 36 in the device interface frequency range independent from the output of the first audio signal. In some embodiments, the ADSP 33 may be configured to control a volume of the second audio signal from the loudspeaker 36 in the device interface frequency range independent from the volume of the first audio signal. For example, the ADSP 33 may be configured to mute the first audio signal over the human interface frequency range without significant reduction of volume for the second audio signal in the device interface frequency range.

In some embodiments, the ADSP 33 may additionally, or alternatively, be configured to pass audio frequencies in the device interface frequency range without substantial attenuation, and adjustably attenuate audio frequencies below the device interface frequency range (e.g., with a high pass filter such as described in more detail in connection with FIG. 4 below). For example, ADSP 33 may be configured to dynamically adjust the attenuation of audio frequencies below the device interface frequency range based on a user input (e.g., from a volume control user interface). In some embodiments, the ADSP 33 may also be configured to adjust the device interface frequency range based on one or more of a user configurable input parameter and a device configurable parameter which corresponds to the loudspeaker 36. In any of the embodiments herein, the second audio signal may be encoded with non-audio related information to be communicated to an external device. In some embodiments, various other services, drivers, and/or applications involved with the audio system in the hardware or software stack may also include features to support the control of the audible content independent from the inaudible content utilized for communication of non-audio related information. Preferably, most or all of the components in the audio system hardware and software stack are fully compatible with both the audible mute/volume control features and the ultrasonic communication features.

Figure 4:
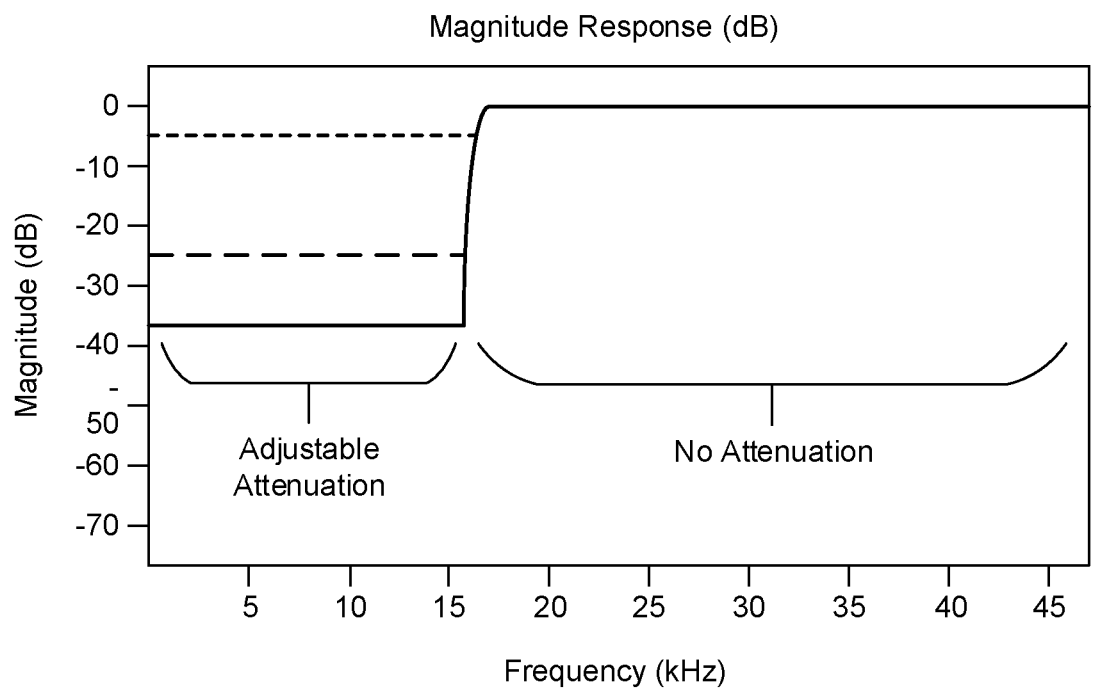
FIG. 4 is a graph of an example of frequency versus magnitude for a high pass filter according to an embodiment.

Turning now to FIG. 4, an example graph of frequency versus magnitude shows an embodiment of an adjustable high pass filter may provide an audible spectrum volume control feature. The adjustable high-pass filter (HPF) may be applied to the audible spectrum during audio playback. As illustrated in FIG. 4, the amplitude of the left portion of the frequency response (e.g., audible frequencies below about 18 kHz) may vary (e.g., adjustable attenuation), based on how the user (e.g., or an application) adjusts the system's volume to a desired level, while the right portion of the frequency response (e.g., inaudible near-ultrasonic and ultrasonic spectrum) is left unaltered (e.g., little or no attenuation) for unimpeded device interface functionality. As noted above, the frequency between the left and right portion may be adjusted based on user input, device capabilities, the listening environment, etc. Some attenuation of the device interface portion by the HPF may be acceptable as long as it does not impede device interface functionality.

Figure 5:
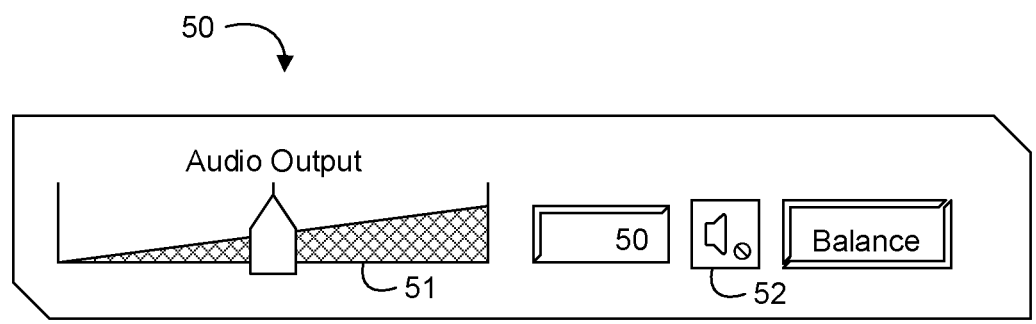
FIG. 5 is an illustrative diagram of an example of a user interface volume control according to an embodiment.

Turning now to FIG. 5, an example of a typical user interface 50 shows a volume bar 51 and a mute toggle 52 (e.g., as might be displayed by an application in the user space of a computer system). In accordance with some embodiments, the volume bar 51, the mute toggle 52, and other adjustable audio parameters affect only the audible spectrum. Adjustment of such an audio control user interface feature may send a signal to the audio service in the kernel space and down to the platform's PCH where an amplitude of a high pass filter is altered accordingly (e.g., as shown in FIG. 4), while the inaudible spectrum is left unaltered.

Figure 6:
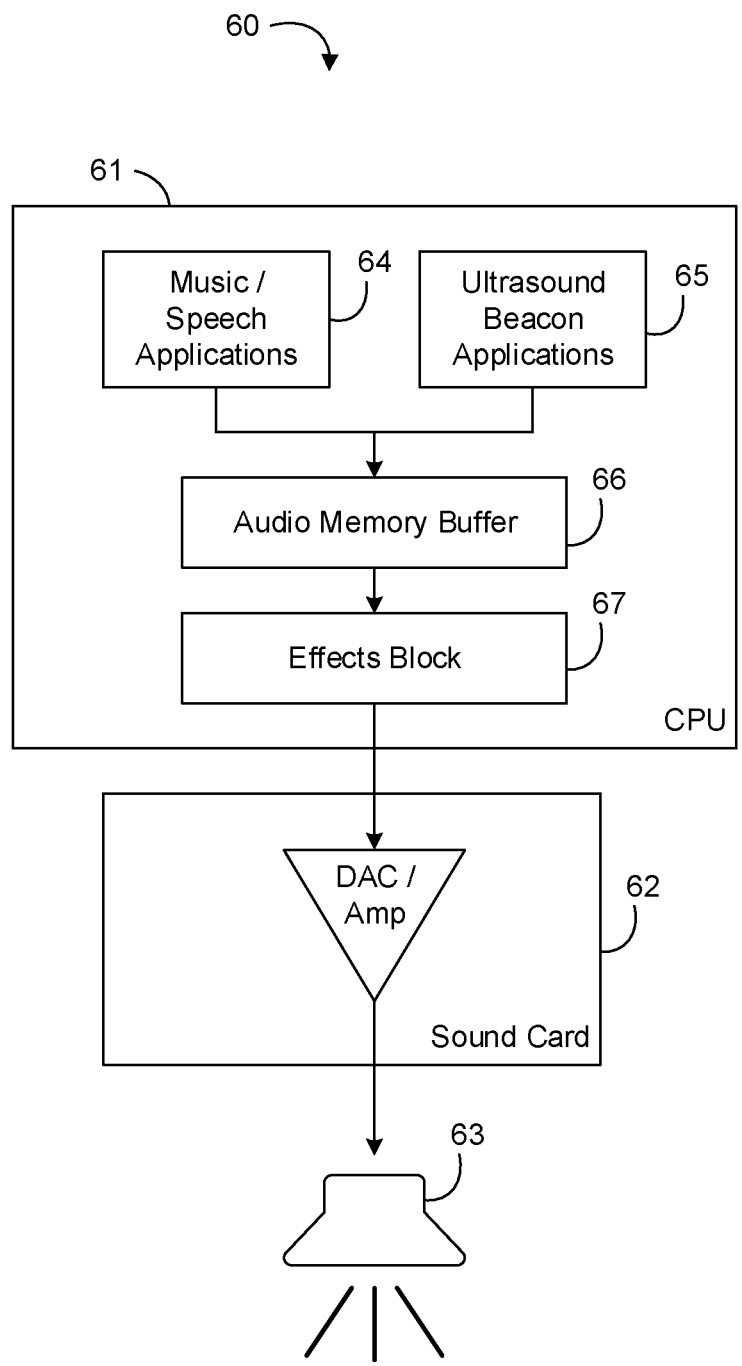
FIG. 6 is a block diagram of another example of an electronic system according to an embodiment.

Turning now to FIG. 6, an embodiment of an electronic system 60 may include a CPU 61 communicatively coupled to a sound card 62, which in turn is coupled to a loudspeaker 63. The system 60 may include audible spectrum mute/volume control technology as described herein with a HPF implemented in software in the CPU 61 or at a driver level. For example, music/speech applications 64 and ultrasound beacon applications 65 may all provide data to an audio memory buffer 66. An effects block 67 may process the audio memory buffer 66 and may include one or more features or aspects of the embodiments described herein to control an output of the audible spectrum independent from an output of the inaudible spectrum (e.g., including the relevant frequencies of the ultrasound beacon applications 65). A full software implementation of the HPF may add relatively more latency and may be more power intensive than other embodiments which include at least some hardware implementation of the HPF. Advantageously, embodiments of the system 60 may support a user experience of being able to control the audible volume of the loudspeaker 63 while decoupling the audible volume from ultrasonic activities.

Figure 7:
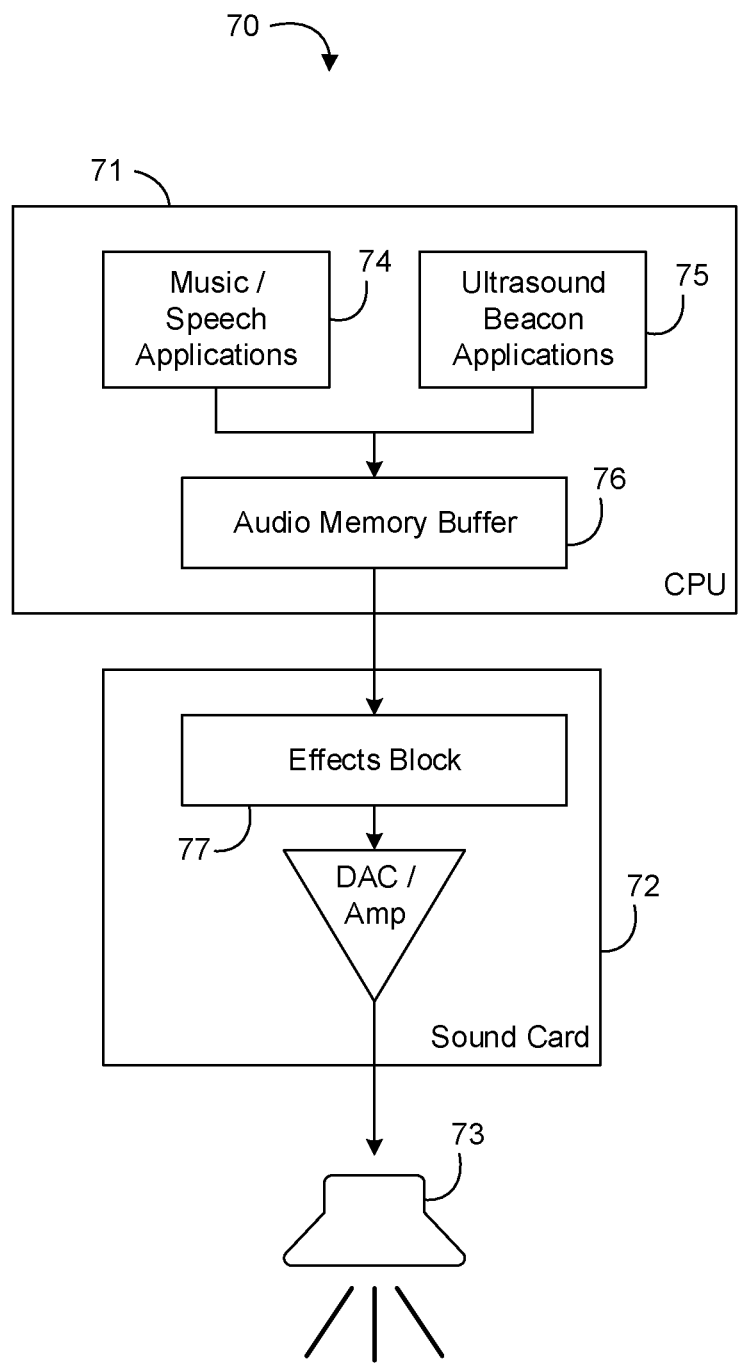
FIG. 7 is a block diagram of another example of an electronic system according to an embodiment.

Turning now to FIG. 7, an embodiment of an electronic system 70 may include a CPU 71 communicatively coupled to a sound card 72, which in turn is coupled to a loudspeaker 73. The system 70 may include audible spectrum mute/volume control technology as described herein with a HPF implemented in an audio codec in the sound card 72. For example, music/speech applications 74 and ultrasound beacon applications 75 may all provide data to an audio memory buffer 76. An effects block 77 in the sound card 72 may process the audio memory buffer 76 and may include one or more features or aspects of the embodiments described herein to control an output of the audible spectrum independent from an output of the inaudible spectrum (e.g., including the relevant frequencies of the ultrasound beacon applications 75). Advantageously, embodiments of the system 70 may support a user experience of being able to control the audible volume of the loudspeaker 73 while decoupling the audible volume from ultrasonic activities.

Figure 8:
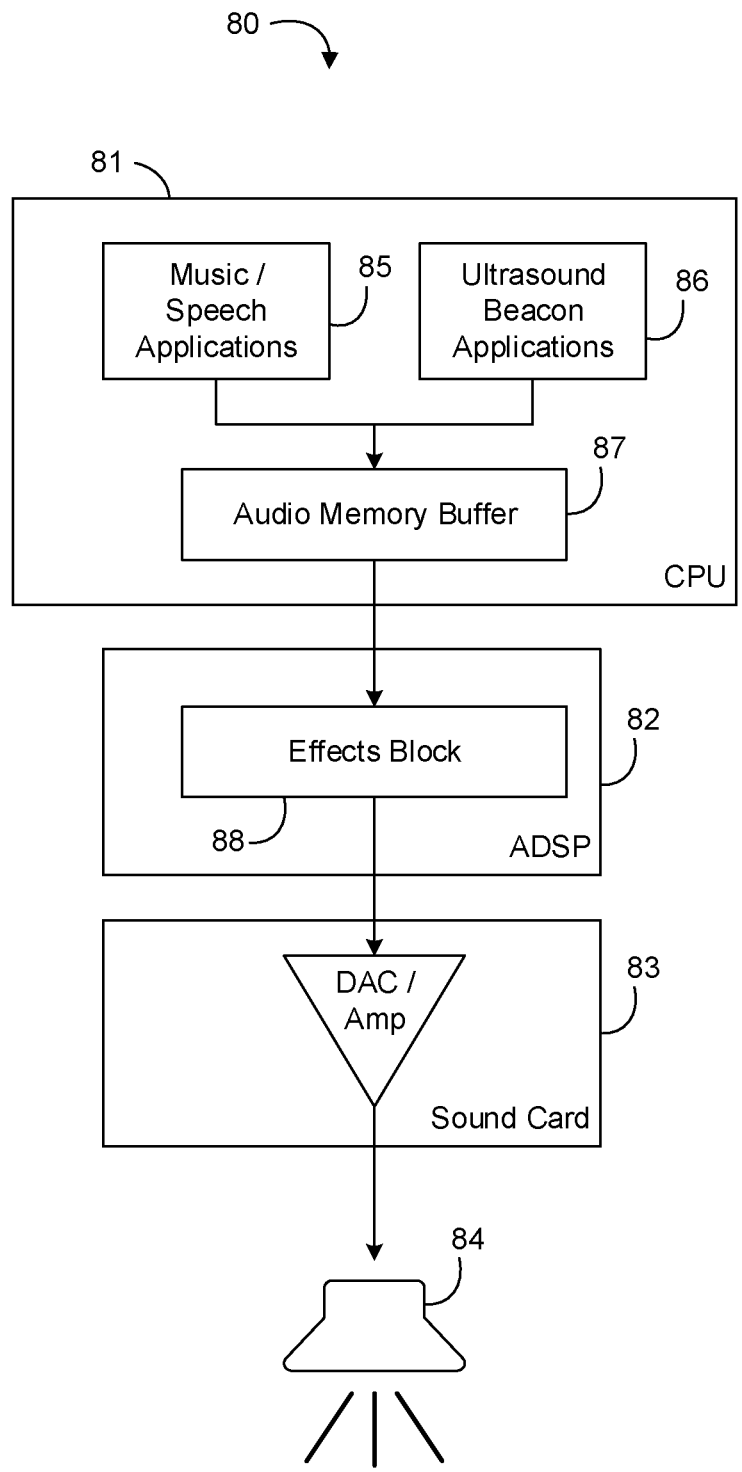
FIG. 8 is a block diagram of another example of an electronic system according to an embodiment.

Turning now to FIG. 8, an embodiment of an electronic system 80 may include a CPU 81 communicatively coupled to an ADSP 82, which in turn is coupled to a sound card 83, which in turn is coupled to a loudspeaker 84. The system 80 may include audible spectrum mute/volume control technology as described herein with a HPF implemented in the ADSP 82. For example, music/speech applications 85 and ultrasound beacon applications 86 may all provide data to an audio memory buffer 87. An effects block 88 in the ADSP 82 may process the audio memory buffer 87 and may include one or more features or aspects of the embodiments described herein to control an output of the audible spectrum independent from an output of the inaudible spectrum (e.g., including the relevant frequencies of the ultrasound beacon applications 86). Advantageously, embodiments of the system 80 may support a user experience of being able to control the audible volume of the loudspeaker 84 while decoupling the audible volume from ultrasonic activities.

Figure 9:
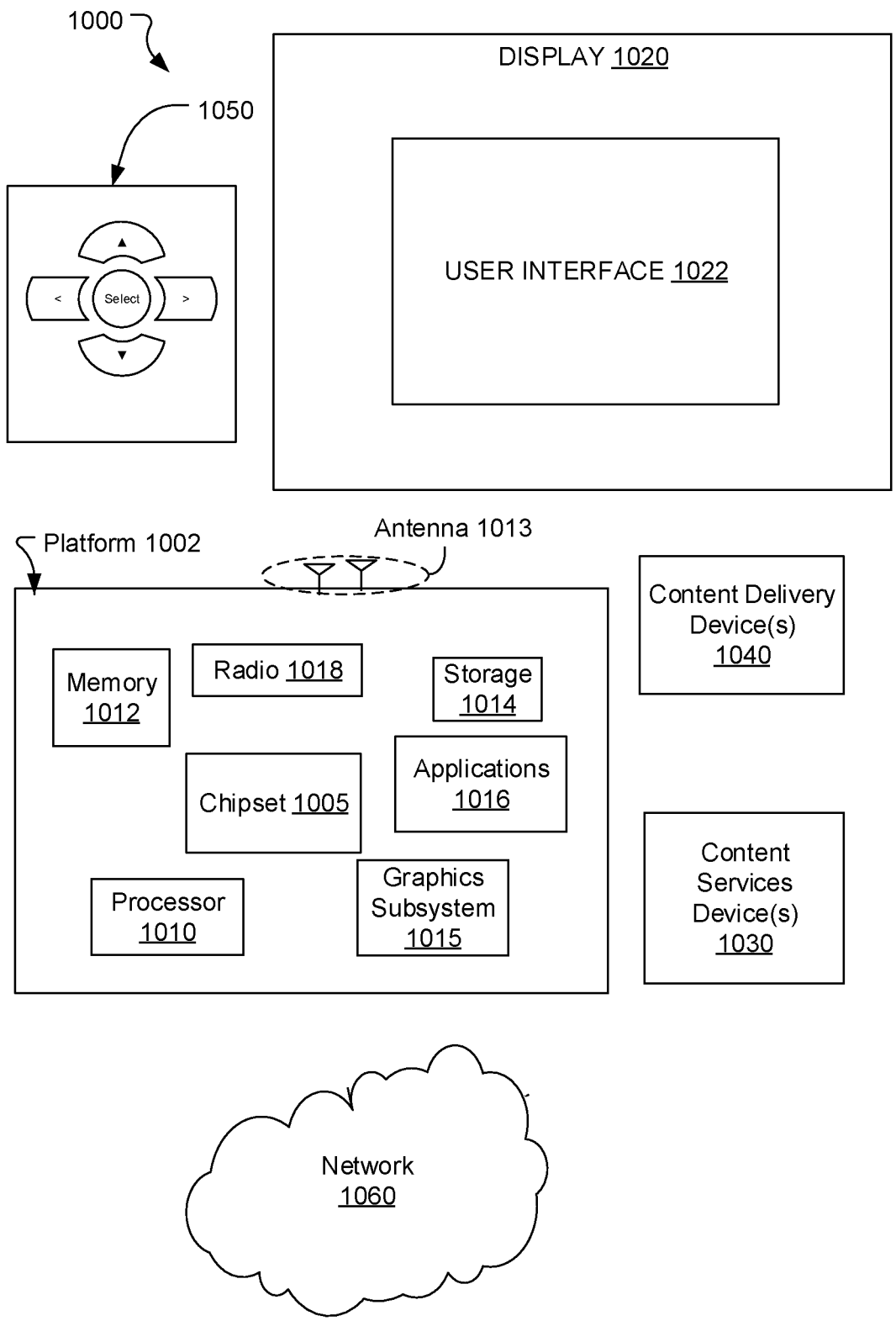
FIG. 9 is an illustrative diagram of an example system.

FIG. 9 is an illustrative diagram of an example system 1000, arranged in accordance with at least some implementations of the present disclosure. In various implementations, system 1000 may be a mobile system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of may be used to interact with user interface 1022, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1020) by movements of a pointer, cursor, focus ring, or other visual indicators displayed on the display. For example, under the control of software applications 1016, the navigation features located on navigation may be mapped to virtual navigation features displayed on user interface 1022, for example. In various embodiments, may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
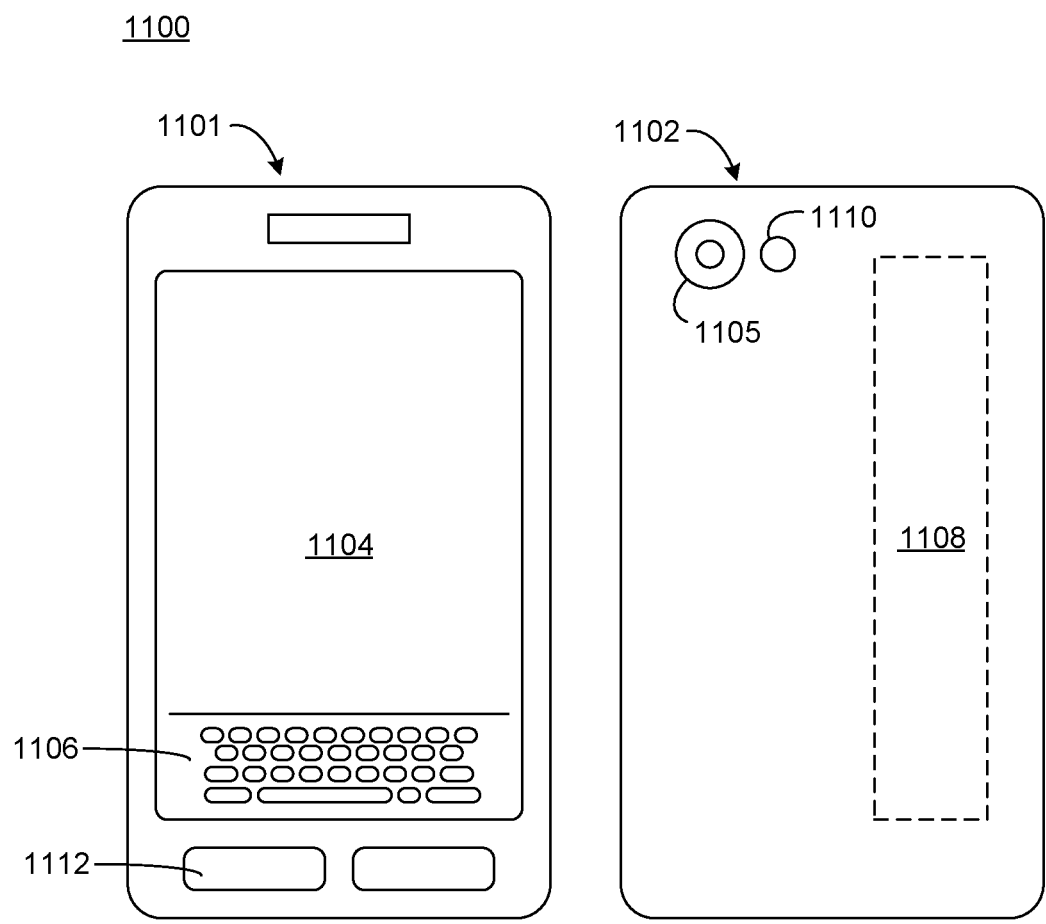
FIG. 10 illustrates an example small form factor device, all arranged in accordance with at least some implementations of the present disclosure.

As described above, system 1000 may be embodied in varying physical styles or form factors. FIG. 10 illustrates an example small form factor device 1100, arranged in accordance with at least some implementations of the present disclosure. In some examples, system 1000 may be implemented via device 1100. In other examples, system 100 or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100. In other examples, camera 1105 and flash 1110 may be integrated into front 1101 of device 1100 or both front and back cameras may be provided. Camera 1105 and flash 1110 may be components of a camera module to originate image data processed into streaming video that is output to display 1104 and/or communicated remotely from device 1100 via antenna 1108 for example.

The system 1000 and/or the device 1100 may include one or more features or aspects of the system 10 (FIG. 1), the method 20 (FIGS. 2A to 2C), and/or any of the other embodiments described herein, including those described in the following examples.

ADDITIONAL NOTES AND EXAMPLES

Example 1 includes an electronic system, comprising an audio output device to output a first audio signal in a human interface frequency range and to output a second audio signal in a device interface frequency range, wherein the human interface frequency range includes frequencies audible to humans and wherein the device interface frequency range includes frequencies above an upper limit of the human interface frequency range, and a controller communicatively coupled to the audio output device, the controller including logic to control an output of the first audio signal from the audio output device in the human interface frequency range, and control an output of a second audio signal from the audio output device in the device interface frequency range independent from the output of the first audio signal. Example 1 may also include logic to control an output of the first audio signal independent from the output of the second audio signal.

Example 2 includes the system of Example 1, wherein the logic is further to control a volume of the second audio signal from the audio output device in the device interface frequency range independent from the volume of the first audio signal.

Example 3 includes the system of Example 2, wherein the logic is further to mute the first audio signal over the human interface frequency range without significant reduction of volume for the second audio signal in the device interface frequency range.

Example 4 includes the system of any of Examples 1 to 3, wherein the logic is further to pass audio frequencies in the device interface frequency range without substantial attenuation, and adjustably attenuate audio frequencies below the device interface frequency range.

Example 5 includes the system of Example 4, wherein the logic is further to dynamically adjust the attenuation of audio frequencies below the device interface frequency range based on a user input.

Example 6 includes the system of any of Examples 1 to 5, wherein the logic is further to adjust the device interface frequency range based on one or more of a user configurable input parameter and a device configurable parameter which corresponds to the audio output device.

Example 7 includes the system of any of Examples 1 to 6, wherein the second audio signal is encoded with non-audio related information to be communicated to an external device.

Example 8 includes a method of controlling audio, comprising controlling an output of a first audio signal from an audio output device in a human interface frequency range, wherein the human interface frequency range includes frequencies audible to humans, and controlling an output of a second audio signal from the audio output device in a device interface frequency range independent from the output of the first audio signal, wherein the device interface frequency range includes frequencies above an upper limit of the human interface frequency range. Example 8 may also include controlling an output of the first audio signal independent from the output of the second audio signal.

Example 9 includes the method of Example 8, further comprising controlling a volume of the second audio signal from the audio output device in the device interface frequency range independent from the volume of the first audio signal.

Example 10 includes the method of Example 9, further comprising muting the first audio signal over the human interface frequency range without significant reduction of volume for the second audio signal in the device interface frequency range.

Example 11 includes the method of any of Examples 8 to 10, further comprising passing audio frequencies in the device interface frequency range without substantial attenuation, and adjustably attenuating audio frequencies below the device interface frequency range.

Example 12 includes the method of Example 11, further comprising dynamically adjusting the attenuation of audio frequencies below the device interface frequency range based on a user input.

Example 13 includes the method of any of Examples 8 to 12, further comprising adjusting the device interface frequency range based on one or more of a user configurable input parameter and a device configurable parameter which corresponds to the audio output device.

Example 14 includes the method of any of Examples 8 to 13, wherein the second audio signal is encoded with non-audio related information to be communicated to an external device.

Example 15 includes at least one machine readable medium comprising a plurality of instructions that, in response to being executed on a computing device, cause the computing device to control an output of a first audio signal from an audio output device in a human interface frequency range, wherein the human interface frequency range includes frequencies audible to humans, and control an output of a second audio signal from the audio output device in a device interface frequency range independent from the output of the first audio signal, wherein the device interface frequency range includes frequencies above an upper limit of the human interface frequency range. Example 15 may also include instructions to control an output of the first audio signal independent from the output of the second audio signal.

Example 16 includes the machine readable medium of Example 15, comprising a plurality of further instructions that, in response to being executed on the computing device, cause the computing device to control a volume of the second audio signal from the audio output device in the device interface frequency range independent from the volume of the first audio signal.

Example 17 includes the machine readable medium of Example 16, comprising a plurality of further instructions that, in response to being executed on the computing device, cause the computing device to mute the first audio signal over the human interface frequency range without significant reduction of volume for the second audio signal in the device interface frequency range.

Example 18 includes the machine readable medium of any of Examples 15 to 17, comprising a plurality of further instructions that, in response to being executed on the computing device, cause the computing device to pass audio frequencies in the device interface frequency range without substantial attenuation, and adjustably attenuate audio frequencies below the device interface frequency range.

Example 19 includes the machine readable medium of Example 18, comprising a plurality of further instructions that, in response to being executed on the computing device, cause the computing device to dynamically adjust the attenuation of audio frequencies below the device interface frequency range based on a user input.

Example 20 includes the machine readable medium of any of Examples 15 to 19, comprising a plurality of further instructions that, in response to being executed on the computing device, cause the computing device to adjust the device interface frequency range based on one or more of a user configurable input parameter and a device configurable parameter which corresponds to the audio output device.

Example 21 includes the machine readable medium of any of Examples 15 to 20, wherein the second audio signal is encoded with non-audio related information to be communicated to an external device.

Example 22 includes an electronic audio controller apparatus, comprising a substrate, and logic coupled to the substrate to control an output of a first audio signal from an audio output device in a human interface frequency range, wherein the human interface frequency range includes frequencies audible to humans, and control an output of a second audio signal from the audio output device in a device interface frequency range independent from the output of the first audio signal, wherein the device interface frequency range includes frequencies above an upper limit of the human interface frequency range. Example 22 may also include logic to control an output of the first audio signal independent from the output of the second audio signal.

Example 23 includes the apparatus of Example 22, wherein the logic is further to control a volume of the second audio signal from the audio output device in the device interface frequency range independent from the volume of the first audio signal.

Example 24 includes the apparatus of Example 23, wherein the logic is further to mute the first audio signal over the human interface frequency range without significant reduction of volume for the second audio signal in the device interface frequency range.

Example 25 includes the apparatus of any of Examples 22 to 24, wherein the logic is further to pass audio frequencies in the device interface frequency range without substantial attenuation, and adjustably attenuate audio frequencies below the device interface frequency range.

Example 26 includes the apparatus of Example 25, wherein the logic is further to dynamically adjust the attenuation of audio frequencies below the device interface frequency range based on a user input.

Example 27 includes the apparatus of any of Examples 22 to 26, wherein the logic is further to adjust the device interface frequency range based on one or more of a user configurable input parameter and a device configurable parameter which corresponds to the audio output device.

Example 28 includes the apparatus of any of Examples 22 to 27, wherein the second audio signal is encoded with non-audio related information to be communicated to an external device.

Example 29 includes an electronic audio controller apparatus, comprising means for controlling an output of a first audio signal from an audio output device in a human interface frequency range, wherein the human interface frequency range includes frequencies audible to humans, and means for controlling an output of a second audio signal from the audio output device in a device interface frequency range independent from the output of the first audio signal, wherein the device interface frequency range includes frequencies above an upper limit of the human interface frequency range. Example 29 may also include means for controlling an output of the first audio signal independent from the output of the second audio signal.

Example 30 includes the apparatus of Example 29, further comprising means for controlling a volume of the second audio signal from the audio output device in the device interface frequency range independent from the volume of the first audio signal.

Example 31 includes the apparatus of Example 30, further comprising means for muting the first audio signal over the human interface frequency range without significant reduction of volume for the second audio signal in the device interface frequency range.

Example 32 includes the apparatus of any of Examples 29 to 31, further comprising means for passing audio frequencies in the device interface frequency range without substantial attenuation, and means for adjustably attenuating audio frequencies below the device interface frequency range.

Example 33 includes the apparatus of Example 32, further comprising means for dynamically adjusting the attenuation of audio frequencies below the device interface frequency range based on a user input.

Example 34 includes the apparatus of any of Examples 29 to 33, further comprising means for adjusting the device interface frequency range based on one or more of a user configurable input parameter and a device configurable parameter which corresponds to the audio output device.

Example 35 includes the apparatus of any of Examples 29 to 34, wherein the second audio signal is encoded with non-audio related information to be communicated to an external device.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic system, comprising:
   an audio output device to output a first audio signal in a human interface frequency range and to output a second audio signal in a device interface frequency range, wherein the human interface frequency range includes frequencies audible to humans and wherein the device interface frequency range includes frequencies above an upper limit of the human interface frequency range;
   an adjustable high pass filter communicatively coupled to the audio output device to:
      adjustably attenuate the output of the first audio signal from the audio output device in the human interface frequency range, and
      pass the output of the second audio signal from the audio output device in the device interface frequency range without substantial attenuation; and
   a controller communicatively coupled to the audio output device and the adjustable high pass filter, the controller including logic to:
   control the first audio signal in the human interface frequency range,
   control the second audio signal in the device interface frequency range independent from the first audio signal, and
   set the upper limit of the human interface frequency range based on a user configurable input parameter, wherein the user configurable input parameter indicates an age of a youngest user.

2. The system of claim 1, wherein the adjustable high pass filter is further to:
   pass the output of the second audio signal from the audio output device in the device interface frequency range substantially unaltered.

3. The system of claim 1, wherein the adjustable high pass filter is further to:
   mute the first audio signal over the human interface frequency range without adjustment of volume for the second audio signal in the device interface frequency range.

4. The system of claim 1, wherein the user configurable input parameter indicates an desired frequency for the upper limit.

5. An electronic system, comprising:
   an audio output device to output a first audio signal in a human interface frequency range and to output a second audio signal in a device interface frequency range, wherein the human interface frequency range includes frequencies audible to humans and wherein the device interface frequency range includes frequencies above an upper limit of the human interface frequency range;
   an adjustable high pass filter communicatively coupled to the audio output device to adjustably attenuate the output of the first audio signal from the audio output device in the human interface frequency range, and pass the output of the second audio signal from the audio output device in the device interface frequency range without substantial attenuation; and
   a controller communicatively coupled to the audio output device and the adjustable high pass filter, the controller including logic to:
   control the first audio signal in the human interface frequency range,
   control the second audio signal in the device interface frequency range independent from the first audio signal,
   set the upper limit of the human interface frequency range based on a user configurable input parameter,
   generate an output at a series of frequencies from the audio output device,
   prompt a user to indicate which of the series of frequencies are audible to the user, and
   set the upper limit of the human interface frequency range based on a highest frequency of the series of frequencies which is indicated by the user to be audible to the user.

6. A method of controlling audio, comprising:
   outputting a first audio signal in a human interface frequency range, wherein the human interface frequency range includes frequencies audible to humans;
   outputting a second audio signal in a device interface frequency range, wherein the device interface frequency range includes frequencies above an upper limit of the human interface frequency range;
   adjustably attenuating the output of the first audio signal with an adjustable high pass filter in the human interface frequency range;
   passing the output of the second audio signal through the adjustable high pass filter in the device interface frequency range without substantial attenuation; and
   setting the upper limit of the human interface frequency range based on a user configurable input parameter, wherein the user configurable input parameter indicates an age of a youngest user.

7. The method of claim 6, further comprising:
   passing the output of the second audio signal through the adjustable high pass filter in the device interface frequency range substantially unaltered.

8. The method of claim 6, further comprising:
   muting the first audio signal over the human interface frequency range with the adjustable high pass filter, without adjustment of volume for the second audio signal in the device interface frequency range.

9. The method of claim 6, wherein the user configurable input parameter indicates an desired frequency for the upper limit.

10. A method of controlling audio, comprising:
- outputting a first audio signal in a human interface frequency range, wherein the human interface frequency range includes frequencies audible to humans;
- outputting a second audio signal in a device interface frequency range, wherein the device interface frequency range includes frequencies above an upper limit of the human interface frequency range;
- adjustably attenuating the output of the first audio signal with an adjustable high pass filter in the human interface frequency range;
- passing the output of the second audio signal through the adjustable high pass filter in the device interface frequency range without substantial attenuation;
- setting the upper limit of the human interface frequency range based on a user configurable input parameter;
- generating an output at a series of frequencies from an audio output device;
- prompting a user to indicate which of the series of frequencies are audible to the user; and
- setting the upper limit of the human interface frequency range based on a highest frequency of the series of frequencies which is indicated by the user to be audible to the user.

11. At least one non-transitory machine readable medium comprising a plurality of instructions that, in response to being executed on a computing device, cause the computing device to:
- output a first audio signal in a human interface frequency range, wherein the human interface frequency range includes frequencies audible to humans;
- output a second audio signal in a device interface frequency range, wherein the device interface frequency range includes frequencies above an upper limit of the human interface frequency range;
- adjustably attenuate the output of the first audio signal with an adjustable high pass filter in the human interface frequency range;
- pass the output of the second audio signal through the adjustable high pass filter in the device interface frequency range without substantial attenuation; and
- set the upper limit of the human interface frequency range based on a user configurable input parameter, wherein the user configurable input parameter indicates an age of a youngest user.

12. The at least one non-transitory machine readable medium of claim 11, comprising a plurality of further instructions that, in response to being executed on the computing device, cause the computing device to:
- pass the output of the second audio signal through the adjustable high pass filter in the device interface frequency range substantially unaltered.

13. The at least one non-transitory machine readable medium of claim 11, comprising a plurality of further instructions that, in response to being executed on the computing device, cause the computing device to:
- mute the first audio signal over the human interface frequency range with the adjustable high pass filter, without adjustment of volume for the second audio signal in the device interface frequency range.

14. The at least one non-transitory machine readable medium of claim 11, wherein the user configurable input parameter indicates an desired frequency for the upper limit.

15. At least one non-transitory machine readable medium, comprising a plurality of instructions that, in response to being executed on a computing device, cause the computing device to:
- output a first audio signal in a human interface frequency range, wherein the human interface frequency range includes frequencies audible to humans;
- output a second audio signal in a device interface frequency range, wherein the device interface frequency range includes frequencies above an upper limit of the human interface frequency range;
- adjustably attenuate the output of the first audio signal with an adjustable high pass filter in the human interface frequency range;
- pass the output of the second audio signal through the adjustable high pass filter in the device interface frequency range without substantial attenuation;
- set the upper limit of the human interface frequency range based on a user configurable input parameter;
- generate an output at a series of frequencies from an audio output device;
- prompt a user to indicate which of the series of frequencies are audible to the user; and
- set the upper limit of the human interface frequency range based on a highest frequency of the series of frequencies which is indicated by the user to be audible to the user.

\* \* \* \* \*